US006955298B2

(12) United States Patent
Herle (10) Patent No.: US 6,955,298 B2
(45) Date of Patent: Oct. 18, 2005

(54) APPARATUS AND METHOD FOR RENDERING WEB PAGE HTML DATA INTO A FORMAT SUITABLE FOR DISPLAY ON THE SCREEN OF A WIRELESS MOBILE STATION

(75) Inventor: Sudhindra Pundaleeka Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 274 days.

(21) Appl. No.: 10/034,729

(22) Filed: Dec. 27, 2001

(65) Prior Publication Data

US 2003/0121983 A1 Jul. 3, 2003

(51) Int. Cl.[7] .................................................. G06K 7/10
(52) U.S. Cl. .............................. 235/472.01; 235/472.02
(58) Field of Search ....................... 235/472.01, 472.02, 235/492; 709/246

(56) References Cited

U.S. PATENT DOCUMENTS

| | | | | |
|---|---|---|---|---|
| 6,300,947 | B1 * | 10/2001 | Kanevsky | 345/866 |
| 6,311,058 | B1 * | 10/2001 | Wecker et al. | 455/418 |
| 6,430,624 | B1 * | 8/2002 | Jamtgaard et al. | 709/246 |
| 6,457,030 | B1 * | 9/2002 | Adams et al. | 715/523 |
| 6,593,944 | B1 * | 7/2003 | Nicolas et al. | 345/744 |
| 2002/0065873 | A1 * | 5/2002 | Ishizuka | 709/203 |
| 2002/0129006 | A1 * | 9/2002 | Emmett et al. | 707/1 |
| 2002/0133626 | A1 * | 9/2002 | Tumbull | 709/246 |
| 2002/0161928 | A1 * | 10/2002 | Ndili | 709/246 |

OTHER PUBLICATIONS

Anderson, Corin, R., et al., University of Washington, Seattle, WA, "Personalizing Web Sites for Mobile Users," WWW10, May 1–5, 2001, Hong Kong, 2001, 27 pages.

Freire, Juliana, et al., Bell Laboratories, 600 Mountain Ave., Murray Hill, NJ 07974; WWW10, May 1–5, 2001, Hong Kong, "WebViews: Accessing Personalized Web Content and Services,", 23 pages.

Chen, Jinlin, et al., Microsoft Research China, No. 49, Zhichun Road, Beijing, 100080, China, "Function–based Object Model Towards Website Adaptation," WWW10, May 1–5, 2001, Hong Kong, 21.

Buchanan, George, et al., Middlesex University Bounds Green Road London, UK, "Improving Mobile Internet Usability," WWW10, May 1–5, 2001, Hong Kong, 2 pages.

Buyukkokten, Orkut, et al., Sanford University, Stanford, CA 94305, "Seeing the Whole in Parts: Text Summarization for Web Browsing on Handheld Devices," WWW10, May 2–5, 2001, Hong Kong, 27.

Schaefer, Robbie, et al., Paderborn University/C–LAB, Fuerstenallee 11, Paderborn, Germany, "Fuzzy Rules for HTML Transcoding," IEEE Computer Society, 35th Hawaii International Conference on System Sciences—2002, 9 pages.

Hori, Masahiro, et al., IBM Tokyo Research Laboratory, 1623–14 Shimo–tsuruma, Yamato, Kanagawa 2428502, Japan, "Annotation–Based Web Content Transcoding,", 21 pages.

* cited by examiner

*Primary Examiner*—Daniel Stcyr
*Assistant Examiner*—April A. Taylor (57) ABSTRACT

There is disclosed a method and apparatus for filtering HTML data into a format that is optimized for the capabilities of a mobile station. The HTML filter generates the reformatted data using the capabilities and limitations of the mobile station and an HTML translation script that is associated with a desired Web site content.

20 Claims, 5 Drawing Sheets

APPARATUS AND METHOD FOR RENDERING WEB PAGE HTML DATA INTO A FORMAT SUITABLE FOR DISPLAY ON THE SCREEN OF A WIRELESS MOBILE STATION

TECHNICAL FIELD OF THE INVENTION

The present invention is directed, in general, to wireless mobile stations and, more specifically, to an apparatus for rendering HTML data for web pages into a format suitable for display on a wireless mobile station.

BACKGROUND OF THE INVENTION

The capability of wireless mobile stations (e.g., cellular telephones, personal digital assistants, handheld computers) is rapidly increasing. Wireless mobile stations now have the ability to access the Internet using a microbrowser that is part of the mobile station. The microbrowser is a very simple version of personal computer browsers such as MICROSOFT'S INTERNET EXPLORER and NETSCAPE'S NETSCAPE COMMUNICATOR.

There are presently a number of competing approaches for browsing the Internet from a mobile station. For example, Wireless Access Protocol (WAP), IMode, and Web Clipping are a few such approaches.

A WAP forum is attempting to standardize the rules for communicating in a wireless manner with the Internet and the World Wide Web. A language designed for this type of communication is the wireless markup language (WML). This language is a new way of encoding World Wide Web content. An extensible markup language (XML) application, WML was designed for wireless communication devices with small, low-resolution screens that are prevalent on cellular telephones.

The problem with WAP-enabled devices or Web Clipping devices to is that an intermediate server is required to translate the HTML content to a form that is suitable and optimized for a particular wireless device. In the case of WAP, for example, the content is formatted to fit the least capable mobile station on the market.

All of these approaches restrict the wireless user to view and interact with a limited subset of Web sites that the service provider chooses to make available to the end user. The end user, for example, may be limited to viewing only YAHOO, EBAY, and SPRINT homepages since those are the only sites that the service provider has translated to the appropriate format for that service provider's mobile stations.

Additionally, choosing the least capable mobile station as the standard, as is done in WAP, does not allow colorful, multimedia Web sites to be displayed well on devices that have the capability to display such sites. Other technologies require that a separate Web site be maintained specifically for that format. This puts the content providers in the position of having to maintain two separate Web sites with near identical content. The user is still limited to visiting only those sites that have the separate content. Therefore, there is a resulting need in the art for a way to provide Internet content to all Web-capable mobile stations without limiting the mobile stations to any particular Web site.

SUMMARY OF THE INVENTION

To address the above-discussed deficiencies of the prior art, it is a primary object of the present invention to provide, for use in a mobile station, an HTML filtering process to optimize HTML data for display on mobile stations.

The wireless mobile station has predetermined capabilities (e.g., display resolution, display size). The mobile station is comprised of an apparatus for converting Web page Hypertext Markup Language (HTML) data into reformatted data that is suitable for rendering on the mobile station's display.

The apparatus comprises a memory containing downloaded Web page HTML data, an HTML filter, and an HTML translation script. The apparatus further comprises a controller that is coupled to the memory. The controller is capable of executing the HTML filter such is that the HTML filter generates the reformatted data from the Web page HTML data. This filtering is accomplished in response to the HTML translation script and the predetermined capabilities of the mobile station. The controller then renders the reformatted data on the screen.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network or mobile station handset.

Figure 1:
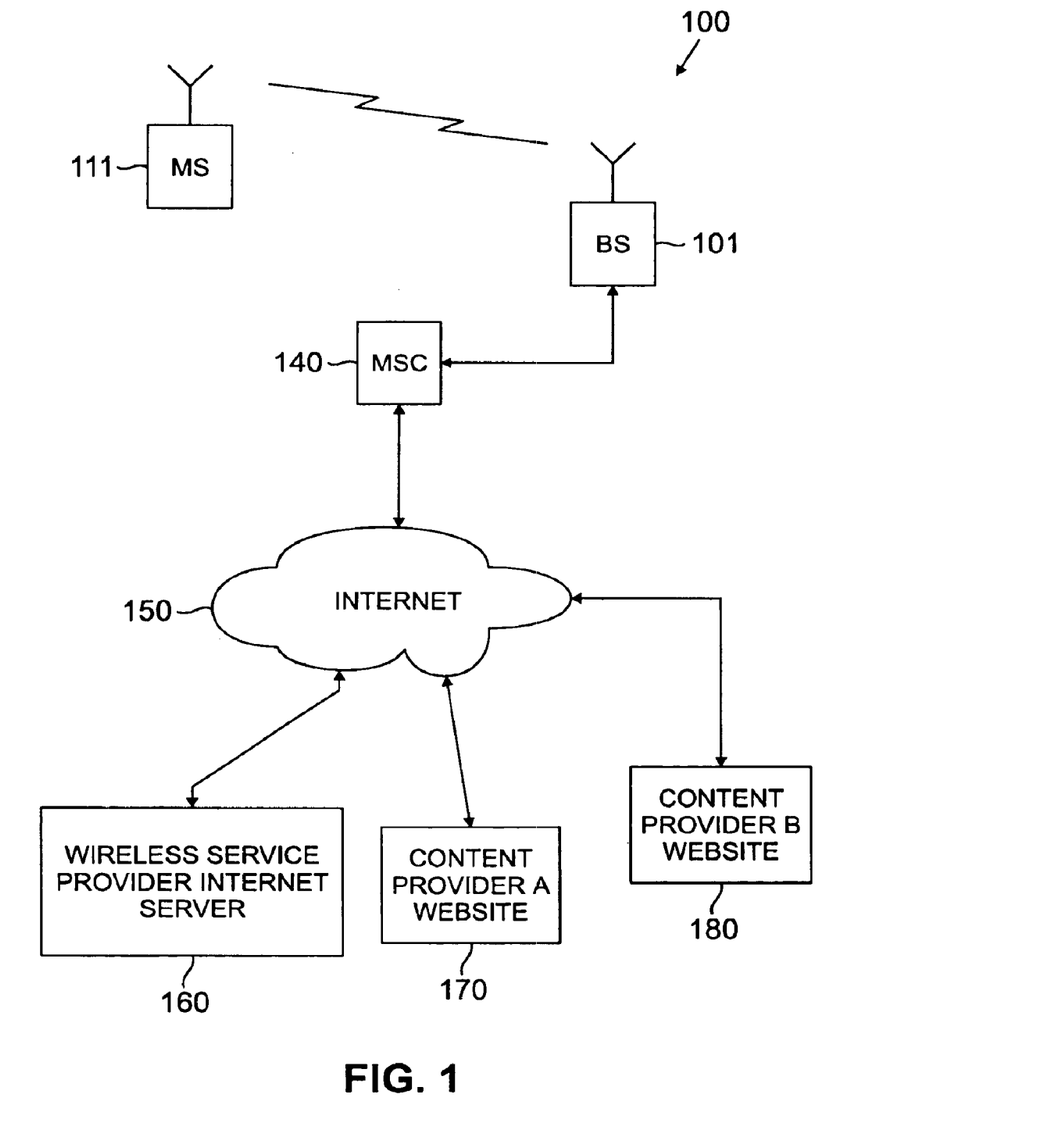
FIG. 1 illustrates selected portions of an exemplary telecommunication network in which an HTML filter according to the principles of the present invention may be implemented in a wireless mobile station or in a wireless service provider Internet server.

FIG. 1 illustrates selected portions of an exemplary telecommunication network 100 in which an HTML filter according to the principles of the present invention may be implemented in a wireless mobile station 111 or a wireless service provider (WSP) Internet server 160. An example of one such telecommunication network is a cellular telephone network.

Base station 101 communicates with at least one mobile stations (MS) 111 over, for example, code division multiple access (CDMA) channels, time division multiple access (TDMA) channels, frequency division multiple access (FDMA) channels, or the like. Mobile station 111 may be any suitable wireless device, including a conventional cellular radiotelephone, PCS handset device, personal digital assistant, portable computer, or metering device. The present invention is not limited to mobile devices. Other types of access terminals, including fixed wireless terminals, may be used. However, for the sake of simplicity, only mobile stations are shown.

In one embodiment of the present invention, BS 101 comprises a base station controller (BSC) and one or more base transceiver station(s) (BTS). A base station controller is a device that manages wireless communications resources, including the base transceiver stations, for specified cells within a wireless communications network.

A base transceiver station comprises the RF transceivers, antennas, and other electrical equipment located in each cell site. This equipment may include air conditioning units, heating units, electrical supplies, telephone line interfaces, and RF transmitters and RF receivers.

For the purpose of simplicity and clarity in explaining the operation of the present invention, only one base station and one mobile station are illustrated. In one embodiment, telecommunication network 100 would typically be comprised of a plurality of base stations that communicate with a plurality of mobile stations.

BS 101 transfers voice and data signals between MS 111 and the Internet 150 via communication lines and mobile switching center (MSC) 140. The communication lines may be any suitable connection means, including a T1 line, a T3 line, a fiber optic link, a network backbone connection, or any other type of data connection. MSC 140 is well known to those skilled in the art.

MSC 140 is a switching device that provides services and coordination between the subscribers in a wireless network and external networks, such as the PSTN or Internet 150. In some embodiments of the present invention, the communication lines may be several different data links where each data link couples a plurality of base stations with the mobile switching center.

A wireless service provider's Internet server 160 is coupled to the Internet 150 through a communication line as described above. An example of a typical wireless service provider is AT&T or SPRINT.

Internet server 160 is a computer server comprising a controller such as a data processor and memory. A server of the present invention is subsequently illustrated in greater detail with reference to FIG. 3.

Telecommunication network 100 is further comprised of a plurality of Web content providers. These content providers maintain Websites on computer servers such as Content Provider A Website 170 and Content Provider B Website 180 illustrated in FIG. 1.

For purposes of clarity, only two Internet content provider websites are illustrated in FIG. 1. Other embodiments have hundreds of thousands or even millions of websites that are accessible by the wireless service provider of the present invention.

Figure 2:
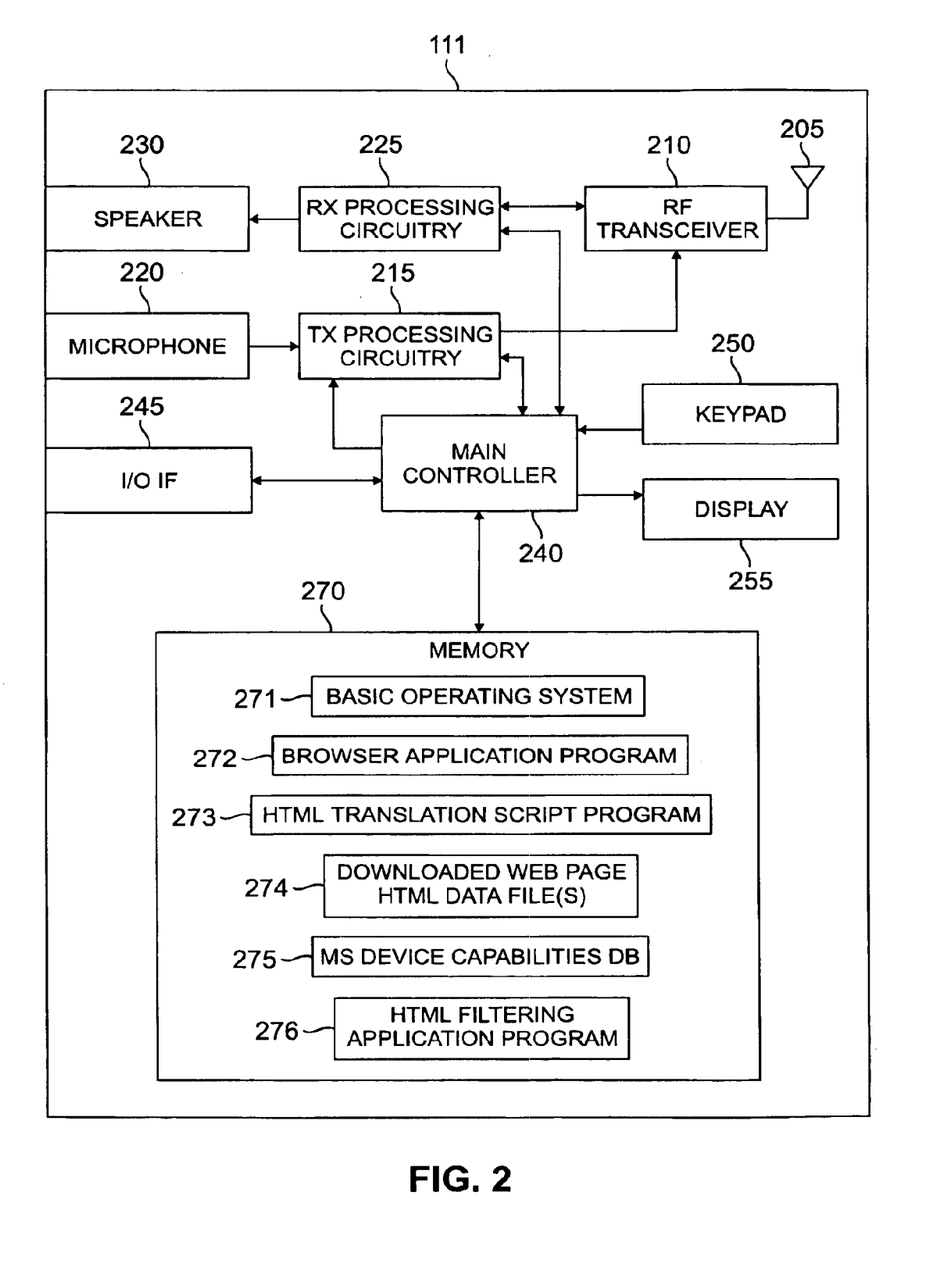
FIG. 2 illustrates the exemplary wireless mobile station in greater detail according to one embodiment of the present invention.

FIG. 2 illustrates exemplary wireless mobile station 111 in greater detail according to one embodiment of the present invention. Wireless mobile station 111 comprises antenna 205, radio frequency (RF) transceiver 210, transmitter (TX) processing circuitry 215, microphone 220, receiver (RX) processor circuitry 225, speaker 230, main controller 240, input/output (I/O) interface (IF) 245, keypad 250, and display 255.

Wireless mobile station 111 further comprises memory 270, that stores basic operating system (OS) program 271, browser application program 272, HTML translation script program(s) 273, downloaded web page HMTL data file(s) 274, MS device capabilities database (DB) 275, and HTML filtering application program 276. Wireless mobile station 111 may be a cell phone, a personal digital assistant (PDA) device equipped with a wireless modem, a two-way pager, a personal communication system (PCS) device, or any other conventional wireless mobile system.

RF transceiver 210 receives, from antenna 205, an incoming RF signal transmitted by a base station of a wireless communication network. RF transceiver 210 down-converts the incoming RF signal to produce an intermediate frequency (IF) or a baseband signal. The IF or baseband signal is sent to RX processing circuitry 225 that produces a processed baseband signal by filtering, decoding, and/or digitizing the baseband or IF signal to produce a processed baseband signal. RX processing circuitry 225 transmits the processed baseband signal to speaker 230 (i.e., voice data) or to main controller 240 for further processing (i.e., web browsing).

TX processing circuitry 215 receives analog or digital voice data from microphone 220 or other outgoing baseband data (i.e., web data, e-mail, interactive video game data) from main controller 240. TX processing circuitry 215 encodes, multiplexes, and/or digitizes the outgoing baseband data to produce a processed baseband or IF signal.

RF transceiver 210 receives the outgoing processed baseband or IF signal from TX processing circuitry 215. RF transceiver 210 up-converts the baseband or IF signal to an RF signal that is transmitted via antenna 205.

Main controller 240, in one embodiment, is a microprocessor or microcontroller. Main controller 240 executes basic OS program 271 in order to control the overall operation of wireless mobile station 111. In one such operation, main controller 240 controls the reception of forward channel signals and the transmission of reverse channel signals by RF transceiver 210, RX processing circuitry 225, and TX processing circuitry 215, in accordance with well known principles.

Main controller 240 is capable of executing other processes and programs that are resident in memory 270. Main controller 240 can move data into or out of memory 270, as required by an executing process.

Main controller 240 is also coupled to I/O interface 245. I/O interface 245 provides the mobile station with the ability to connect to other devices such as laptop computers and handheld computers. I/O interface 245 is the communication path between these accessories and main controller 240.

Main controller 240 is also coupled to keypad 250 and display unit 255. Keypad 250 is used by the end-user of the mobile station to enter data into the mobile station. Display 255, in the preferred embodiment, is a liquid crystal display capable of rendering text and/or at least limited graphics from Web sites. Alternate embodiments use other types of displays.

Memory 270 is coupled to main controller 240. Memory 270 may be comprised of solid-state memory such as random access memory (RAM), various types of read only memory (ROM), or Flash RAM. Memory 270 may also include other types of memory such as micro-hard drives or removable media that stores data.

Memory 270 stores browser application program 272. This application, in one embodiment, is a limited version of a browser such as NETSCAPE NAVIGATOR. Browser application program 272 is capable of accessing Web sites by transmitting a content request that is initiated by the end user. The end user may enter the Web site network address, such as the universal resource locator (URL), in order to request that content from that site be downloaded to the memory of the mobile station.

Memory 270 also stores HTML translation scripts such as HTML translation script program 273. HTML translation script 273 is a set of commands that indicate how the Web site associated with the script is to be filtered by HTML filtering application program 276 that is discussed subsequently. Each Web site may have a different translation script that is tailored for the content resident on that Web site.

In one embodiment, this translation script is downloaded from a Web site and stored in memory 270. In another embodiment, HTML translation script program 273 is stored in memory with other translation scripts from recently accessed Web sites. By storing these scripts in local memory, translation time is reduced by eliminating the requirement to download the script each time a Web site is accessed.

In yet another embodiment, the HTML translation scripts are stored in a larger script repository on the Internet. For example, the end-user's wireless service provider may have a server that is coupled to the Internet that stores translation scripts for popular Web sites.

Memory 270 additionally stores downloaded Web page HTML data files 274. This HTML data is the content that the end-user requested through browser 272.

In one embodiment, memory 270 stores MS device capabilities 275. This database includes most or all of the attributes of the mobile station including: display size, display resolution, display type, number of colors possible for display, memory size, and other predetermined capabilities of the mobile station.

In another embodiment, the mobile station capabilities are not stored in a database in memory 270. In this embodiment, when the capabilities are required by the HTML filter, main controller 240 polls the various elements of the mobile station in order to determine its capabilities. This embodiment reduces the memory required to store such capabilities.

Memory 270 additionally stores HTML filtering application program 276. Main controller 240 executes this HTML filter to reformat downloaded HTML Web pages in order to optimize the HTML data for the capabilities of the mobile station. The operation of the HTML filter is described in greater detail subsequently with reference to FIG. 4.

The HTML filter of FIG. 2 assumes that HTML Web page data is downloaded to the mobile station and the filtering operation is performed by the mobile station's HTML filter. In another embodiment, the wireless service provider's Internet server is responsible for performing the filtering operation prior to downloading the reformatted HTML data to the mobile station.

Figure 3:
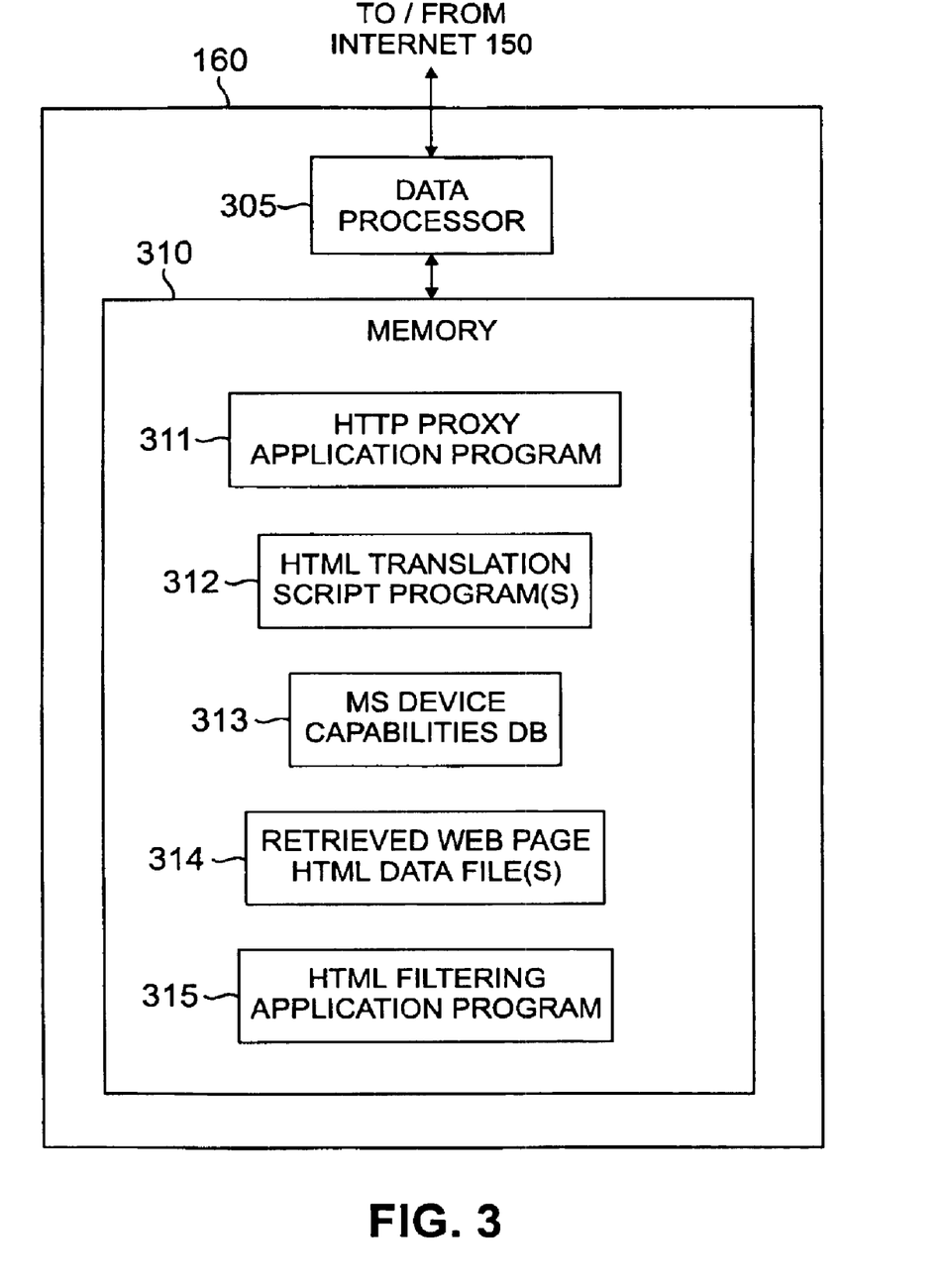
FIG. 3 illustrates the exemplary wireless service provider Internet server in greater detail according to one embodiment of the present invention.

FIG. 3 illustrates exemplary wireless service provider (WSP) Internet server 160 in greater detail according to one embodiment of the present invention. WSP Internet server 160 comprises data processor 305 and memory 310.

Data processor 305, in one embodiment, is a microprocessor or microcontroller. Other embodiments use other types of controllers, such as parallel processors, for greater processing power. Data processors are well known in the art and are not discussed further.

Memory 310 is coupled to data processor 305 and stores Hypertext Transfer Protocol (HTTP) proxy application program 311, HTML translation script program(s) 312, mobile station (MS) device capabilities database (DB) 313, and retrieved web page HTML data file(s) 314. Memory 310 may be semiconductor memory such as RAM, various types of ROM, or Flash RAM. Memory 310 also includes hard drives, micro-drives, or removable storage media for storing of computer data.

Data processor 305 is capable of executing HTTP proxy application program 311 in order to provide Internet communication capability for the Internet server and to control the overall operation of the server. The proxy application provides customers of the wireless service provider with quicker downloads of popular Web site content since that content can be stored on the Internet server. HTTP proxy application program 311 also handles the protocol required to access other Internet Web sites.

Memory 310 also stores HTML translation script program(s) 312. Memory 310 may store various popular Web site scripts in order to minimized the translation time. In another embodiment, data processor 305 may retrieve each HTML translation script from the associated Web site as it is needed. These translation script programs are discussed in greater detail above.

In one embodiment, memory 310 stores the capabilities of the various mobile stations that subscribe to the wireless service provider's services. In this embodiment, the mobile station transmits some type of identification to Internet server 160 at some point during registration with the system or when the mobile station is attempting to download Web content. This identification may include the mobile station's electronic serial number (ESN), number assignment module (NAM), or some other form of uniquely identifying the mobile station.

The Internet server receives the identification and uses it to search MS device capabilities database 313 in order to determine the capabilities of the mobile station. In this embodiment, each mobile station that subscribes to the wireless service provider's service is included in the database.

In an alternate embodiment, the mobile station transmits its capabilities to the Internet server when those capabilities are required for the filtering process of the present invention. This embodiment requires additional time for filtering but reduces the burden on the wireless service provider to update and maintain the database.

Memory 310 also stores retrieved Web page HTML data file(s) 314. This is the HTML data that has been requested by the mobile station. As is discussed subsequently with reference to FIG. 4, the Internet server retrieves this data when the mobile station initiates the content request.

HTML filtering application program 315 is stored in memory 310 and is executed by data processor 305. As in the embodiment of FIG. 2, this HTML filter is responsible for reformatting retrieved Web page HTML data file(s) 314 in response to the capabilities of the mobile station and using the particular HTML translation script associated with the retrieved Web page.

Figure 4:
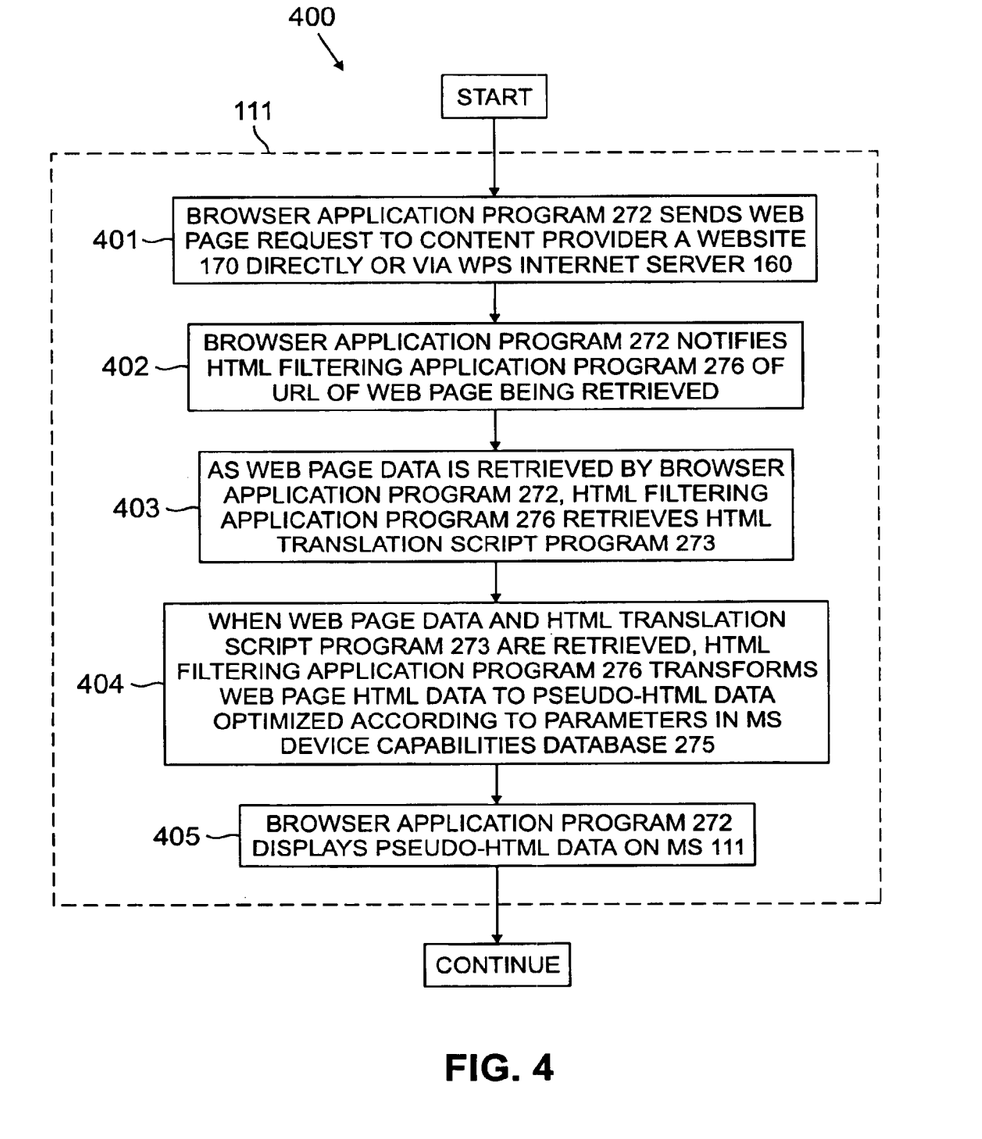
FIG. 4 is a flow diagram illustrating the operation of the exemplary HTML filter according to an exemplary embodiment of the present invention.

FIG. 4 depicts flow diagram 400 that illustrates the operation of the exemplary HTML filter according to an exemplary embodiment of the present invention. In this embodiment, the HTML filtering is accomplished in the mobile station.

Browser application program 272 sends a Web page request to content provider A website 170 directly or via WPS Internet server 160 (process step 401). Browser application program 272 notifies HTML filtering application program 276 of the URL, or other network address, of the web page being retrieved (process step 402).

As the Web page data is retrieved by browser application program 272, HTML filtering application program 276 retrieves HTML translation script program 273 (process step 403). When the Web page data and HTML translation script program 273 are downloaded, HTML filtering application program 276 transforms the Web page HTML data to pseudo-HTML data.

The filter process is accomplished by using MS device capabilities database 275 of the mobile station along with HTML translation script program 273 that is associated with the Web page data in order to optimize the psuedo-HTML data (process step 404). In other words, the translation script may indicate that the desired Web content is comprised of 65535 colors in a 640×480 format and the mobile station is only capable of displaying 256 colors in a 240×240 format. In this case, the filter will alter the content's color and resolution in order to render it properly on the mobile station's display.

Browser application program 272 then displays the optimized pseudo-HTML data on wireless mobile station 111 (process step 405). In alternate embodiments, the optimized data is rendered by other elements of the mobile station.

Figure 5:
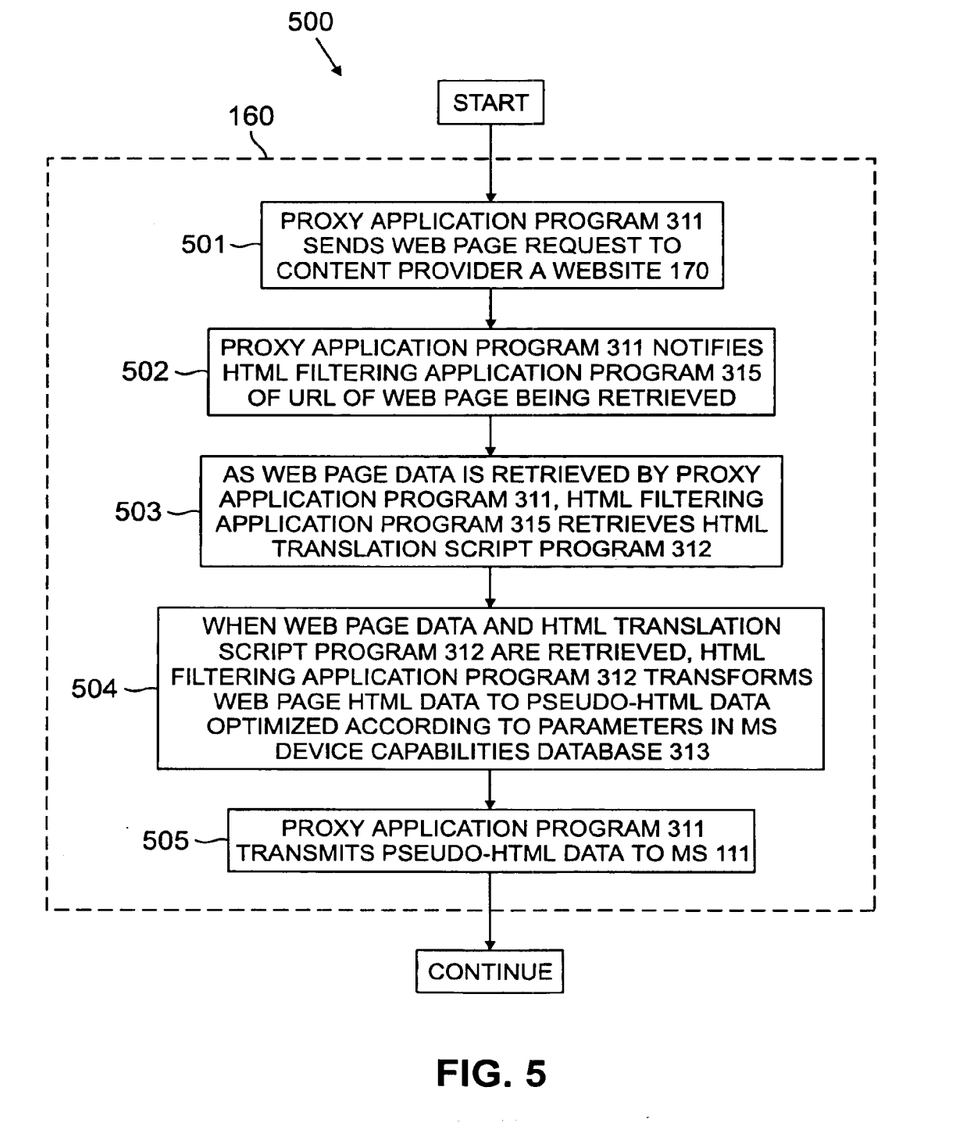
FIG. 5 is a flow diagram illustrating the operation of the exemplary HTML filter according to an alternate embodiment of the present invention.

FIG. 5 depicts flow diagram 500 that illustrates the operation of the exemplary HTML filter according to an alternate embodiment of the present invention. In this embodiment, the HTML filtering is accomplished in the wireless service provider's Internet server.

HTTP proxy application program 311 sends a Web page request to content provider A website 170 (process step 501). This request originally came from the mobile station and is being relayed by the Internet server in its role as a proxy server. HTTP proxy application program 311 notifies HTML filtering application program 315 of the URL, or other network address, of the web page being retrieved (process step 502).

As the Web page data is retrieved by proxy application program 311, HTML filtering application program 315 retrieves HTML translation script program 312 (process step 503). When the Web page data and HTML translation script program 312 are downloaded, HTML filtering application program 315 transforms the Web page HTML data to pseudo-HTML data.

The filter process is accomplished by using MS device capabilities database 313 associated with the requesting mobile station along with HTML translation script program(s) 312 that is associated with the Web page data in order to optimize the pseudo-HTML data (process step 504). In other words, the translation script may indicate that retrieved Web page HTML data file 314 is comprised of 65535 colors in a 640×480 format and the mobile station is only capable of displaying 256 colors in a 240×240 format. In this case, the filter will alter the content's color and resolution in order to render it properly on the mobile station's display.

HTTP proxy application program 311 then transmits the optimized pseudo-HTML data to wireless mobile station 111 (process step 505). This step includes the Internet server transmitting the data through the Internet 150 to MSC 140. MSC 140 routes the data through BS 101 to MS 111. The optimized data is then rendered on the mobile station's display.

In one embodiment, the HTML filter of the present invention is a custom script interpreter for interpreting the HTML translation scripts associated with each Web page. An example of op-codes of one such HTML translation scripts might be:

| | |
|---|---|
| tagdel FRAME | ;delete all FRAME tags |
| xcvt TABLE page | ;convert TABLES into multiple HTML pages |
| %Imgcvt_if 65535 | ;convert images to 64k colors if supported |
| %Imgcvt_if 256 | ;convert images to 256 colors if 64k |
| | ;colors are not supported |
| %Imgcvt 2 | ;convert images to monochrome otherwise |

In such an embodiment, the HTML filter would use the capabilities of the mobile station to determine what the color capability of the display is and adjust the image according to the script. Additionally, the HTML filter might remove other portions of the Web page that cannot be displayed on a particular mobile station.

This mnemonic-based script can then be translated into a more compact binary format if it is being performed in the WSP Internet server. This would minimize the number of over-the-air bytes transmitted and, therefore, the translation time.

The above script example is only one of many such translation scripts. The present invention is not limited by any one type, content, or format of script.

In summary, the HTML filtering apparatus and process of the present invention provides a wireless mobile station with the capability of displaying Web content in a format that has been optimized for the mobile station's capabilities. This reduces or eliminates the requirement that Internet content providers generate and maintain multiple Web sites for different mobile station capabilities.

Although the present invention has been described in detail, those skilled in the art should understand that they can make various changes, substitutions and alterations herein without departing from the spirit and scope of the invention in its broadest form.

What is claimed is:

1. For use in a wireless mobile station having predetermined capabilities, an apparatus for converting Web page Hypertext Markup Language (HTML) data into reformatted data that is suitable for rendering on a display of the wireless mobile station, the apparatus comprising:
    memory that contains downloaded original Web page HTML data received from a content provider, an HTML filter, and an HTML translation script downloaded from the content provider; and
    a controller, coupled to the memory, that is capable of executing the HTML filter such that the HTML filter generates the reformatted data from the Web page HTML data in response to the HTML translation script and the predetermined capabilities, the controller is further capable of rendering the reformatted data on the screen.

2. The apparatus as set forth in claim 1 further comprising a radio frequency transceiver that transmits and receives radio frequency signals representative of the original Web page HTML data that is downloaded from a Web site maintained by the content provider.

3. The apparatus as set forth in claim 1 wherein the predetermined capabilities include the wireless station's display size, display resolution, color capabilities, and audio capabilities.

4. The apparatus as set forth in claim 1 further comprising a browser application in memory that is executed by the controller such that the browser application requests the original Web page HTML data to be downloaded from a Web site maintained by the content provider and the browser application further informs the HTML filter of a location of the Web site.

5. The apparatus as set forth in claim 4 wherein the memory further includes a plurality of HTML translation scripts downloaded from a plurality of content providers and the controller is capable of selecting a first HTML translation script in response to the original Web page HTML data received from a first content provider.

6. The apparatus as set forth in claim 4 wherein the controller is capable of downloading the HTML translation script from the Web site.

7. The apparatus as set forth in claim 1 wherein the memory further comprises a database of the predetermined capabilities for use by the controller.

8. For use in a network server, an apparatus that reformats hypertext markup language (HTML) data for rendering on a mobile station having predetermined capabilities including a display, the apparatus comprising:
    memory that contains a proxy application. Web page HTML data, an HTML filter, and an HTML translation script; and
    a data processor, coupled to the memory, that is capable of
        executing the HTML filter such that the HTML filter generates the reformatted HTML data from the Web page HTML data in response to the HTML translation script and the predetermined capabilities,
        executing the proxy application such that the proxy application requests the Web page HTML data to be downloaded from a Web site prior to receiving a request from a mobile station for the Web page and the proxy application further informs the HTML filter of a location of the Web site, and
        transmitting the reformatted HTML data to the mobile station for rendering on the display.

9. The apparatus as set forth in claim 8 wherein the predetermined capabilities include the wireless station's display size, display resolution, color capabilities, and audio capabilities.

10. The apparatus as set forth in claim 8 wherein the memory further includes a plurality of HTML translation scripts and the data processor is capable of selecting a first HTML translation script in response to the Web page HTML data.

11. The apparatus as set forth in claim 8 wherein the memory further comprises a database of the predetermined capabilities for use by the data processor.

12. The apparatus as set forth in claim 11 wherein the data processor is capable of determining the predetermined capabilities of the mobile station in response to a mobile station identification transmitted to the apparatus.

13. The apparatus as set forth in claim 8 wherein the data processor is coupled to the Internet.

14. For use in a wireless mobile station having predetermined capabilities and memory that stores a hypertext markup language (HTML) filter, a method of rendering Web page HTML data into a format suitable for a display of the wireless mobile station, the method comprising the steps of:
    requesting an original Web page, comprising HTML data, from a content provider having a network address;
    informing the HTML filter of the content provider's network address;
    retrieving from the content provider an HTML translation script that is associated with the Web page;
    generating in the HTML filter a reformatted Web page from the Web page HTML data in response to the HTML translation script and the predetermined capabilities; and
    rendering the reformatted Web page on the display.

15. The method as set forth in claim 14 wherein the step of retrieving the HTML translation script comprises downloading the HTML translation script from the content provider.

16. The method as set forth in claim 14 wherein the step of retrieving the HTML translation script comprises downloading the HTML translation script from a translation script storage server.

17. The method as set forth in claim 14 wherein the step of retrieving the HTML translation script comprises selecting the HTML translation script from the mobile station's memory.

18. The method as set forth in claim 14 wherein the predetermined capabilities are stored in a database in the mobile station's memory.

19. For use in a network server having memory that stores a hypertext markup language (HTML) filter and an HTML translation script, a method of rendering Web page HTML data into a format suitable for a display of a wireless mobile station having predetermined capabilities, the method comprising the steps of:
    requesting a Web page, comprising HTML data, from a content provider having a network address;
    receiving a request from a wireless mobile station for the Web page;
    informing the HTML filter of the content provider's network address;
    retrieving an HTML translation script that is associated with the Web page;
    generating in the HTML filter a reformatted Web page from the Web page HTML data in response to the HTML translation script and the predetermined capabilities; and transmitting the reformatted Web page to the mobile stations, wherein the Web page is requested from the content provider prior to receiving the request for the Web page from the mobile wireless station.

20. The method as set forth in claim 19 wherein the predetermined capabilities are associated with an identification of the mobile station in the network server memory.

* * * * *